(12) United States Patent
Niwa (10) Patent No.: US 6,472,075 B1
(45) Date of Patent: Oct. 29, 2002

(54) SINTERED SILICON NITRIDE MEMBER AND CERAMIC BALL

(75) Inventor: Tomonori Niwa, Aichi (JP)

(73) Assignee: NGK Spark Plug Co., Ltd., Aichi (JP)

(*) Notice: Subject to any disclaimer, the term of this patent is extended or adjusted under 35 U.S.C. 154(b) by 0 days.

(21) Appl. No.: 09/657,008

(22) Filed: Sep. 7, 2000

(30) Foreign Application Priority Data

Sep. 8, 1999 (JP) .......................................... 11-254741

(51) Int. Cl.[7] .................................................. B32B 9/04
(52) U.S. Cl. ..................... 428/446; 428/312.6; 428/402; 428/408; 428/689; 428/690; 428/701; 428/698; 428/704
(58) Field of Search ................................ 428/408, 698, 428/212, 304.4, 312.6, 446, 704, 689, 310.5, 484, 690, 402, 701

(56) References Cited

U.S. PATENT DOCUMENTS 5,462,813 A 10/1995 Nagano et al.
5,571,611 A 11/1996 Nagano et al.
5,767,027 A * 6/1998 Sakon et al. ............... 501/98.4

FOREIGN PATENT DOCUMENTS

| JP | 63-229137 | 9/1988 |
| JP | 4-254471 | 9/1992 |
| JP | 4-254473 | 9/1992 |
| JP | 8-52712 | 2/1996 |

* cited by examiner

Primary Examiner—Deborah Jones
Assistant Examiner—Abraham Bahta
(74) Attorney, Agent, or Firm—Sughrue Mion, PLLC (57) ABSTRACT

A sintered silicon nitride member formed predominantly of silicon nitride, wherein at least a surface of the sintered member has a lightness VS of 3.0 to 9.0 and/or a chroma CS of not greater than 3.0. The sintered member facilitates identification of defects such as pore and/or foreign matter of different color formed at the surface and is capable of enhancing inspection accuracy. Also disclosed is a sintered silicon nitride member in the form of a ceramic ball having such a lightness on its surface.

16 Claims, 8 Drawing Sheets

SINTERED SILICON NITRIDE MEMBER AND CERAMIC BALL

BACKGROUND OF THE INVENTION

1. Field of the Invention

The present invention relates to a sintered silicon nitride member, and to a sintered silicon nitride member in the form of a ceramic ball.

2. Description of the Related Art

Recently, silicon nitride ceramic has been applied to bearings of machine tools and hard disk drives of computers, because of its high strength and excellent wear resistance. Also, because of its corrosion resistance at high temperature, silicon nitride ceramic has been applied to bearings and sliding components used in high-temperature, corrosive environments, such as bearings and sliding components of driving units of semiconductor equipment and sliding components of automobiles, such as tappets.

In manufacture of the above-mentioned ceramic components, after precision polishing, the ceramic components are inspected for material-related defects, such as foreign matter and pores, and defects caused by polishing, such as scratches, cuts, and chips. This inspection may be carried out using a stereomicroscope or metallographic microscope. Recently, in order to cope with mass production and to reduce cost, an automatic appearance inspection machine has been employed, in some cases. Specifically, an image of a polished surface is captured, and the captured image is inspected for defects, such as foreign matter or pores on the polished surface. Such defects are identified by means of contrast of color tone or brightness between a defective portion and a background portion.

3. Problems to be Solved by the Invention

Generally, the appearance of a sintered silicon nitride body assumes a color tone of white or bright gray. Similarly, a defect such as a pore or a chip appears in a bright tone. Thus, contrast is hardly produced between such a defect and the background, resulting in poor accuracy in defect identification. Particularly, in the case of an automatic appearance inspection machine, which identifies a defect by processing data regarding the difference in color and/or lightness between background and a defective portion, low contrast therebetween is directly linked to an impairment in inspection accuracy. According to a method disclosed in Japanese Patent Application Laid-Open (kokai) Nos. 254471/1992 and 254473/1992, a sintered body is intentionally colored black or dark gray by sintering a shaped body containing a source of carbon or by impregnating a porous body with carbon, to thereby decrease nonuniform color tone appearing on the sintered body. Background in black or dark gray facilitates identification of, for example, a pore or a chip, which appears in a relatively bright tone, but encounters difficulty in identifying foreign matter, particularly metallic foreign matter, which appears in black or blackish gray.

SUMMARY OF THE INVENTION

It is therefore an object of the present invention to provide a sintered silicon nitride member which facilitates identification of defects and foreign matter of different color tones and which is capable of enhancing inspection accuracy, as well as to provide a ceramic ball formed of the same.

The above objects of the present invention have been achieved by providing a sintered silicon nitride member formed predominantly of silicon nitride, wherein at least a surface of the sintered member has a lightness VS of 3.0 to 9.0. As used herein, the lightness VS is defined in a color specification as specified by JIS Z 8721 (published Feb. 19, 1993, Japanese Standards Association).

In the present invention, unless otherwise specified, the term "predominant" used in relation to content means that the content of a substance in question is contained in an amount of not less than 50% by weight (the terms "predominantly" and "mainly" have the same meaning as used herein).

In the present invention, by imparting a lightness VS of 3.0 to 9.0 to the surface of a sintered silicon nitride member, the surface, particularly when polished, of the member establishes a background color tone which facilitates identification of a defect, such as a pore, a chip, or a cut, as well as foreign matter. The background is toned differently from such a defect, thereby improving inspection accuracy of, for example, an automatic appearance inspection machine.

When the polished surface of a ceramic component is inspected for metallic foreign matter and defects, such as pores, cuts, and chips (hereinafter, these defects are generically called a "pore, etc."), foreign matter or a pore, etc., is identified by means of difference in color or lightness between a base material serving as background and the foreign matter or pore, etc. Specifically, by observing with a stereomicroscope or by observing with a metallographic microscope using polarized light, metallic foreign matter appears in a color tone close to black, whereas an internal pore or a cut appears in a color tone close to white.

Herein, the meaning of color includes not only chromatic color but also achromatic color that has no chroma. Therefore, when it is acknowledged that colors are different from each other, it means that at least one of lightness, chroma and hue differs between the colors.

By imparting a lightness VS of 3.0 to 9.0 to a background portion, at a portion where metallic foreign matter or a pore, etc., is present, the background assumes a substantially neutral tint between metallic foreign matter and a pore, etc., thereby producing a distinct contrast with both metallic foreign matter and a pore, etc., which assume different color tones. Thus, metallic foreign matter or a pore, etc. can be readily identified by observing with a stereomicroscope or with a metallographic microscope using polarized light.

When the base material assumes a lightness of less than 3.0 (i.e., dark black), metallic foreign matter is hardly identified, since metallic foreign matter appears in black. When the base material assumes a lightness of greater than 9.0 (i.e., near white), a pore, etc., is hardly identified, since the pore, etc., appears in white. The above-mentioned lightness VS is preferably 4.0 to 8.5, more preferably 4.5 to 8.0. In order to enhance contrast with foreign matter or a pore, etc., the appearance of the sintered silicon nitride member assumes a chroma CS of not greater than 3.0 as defined by JIS Z 8721 (published Feb. 19, 1993, Japanese Standards Association), preferably not greater than 2.0, more preferably not greater than 1.0.

The lightness VS and the chroma CS are measured according to "4.3 Measuring method for reflecting objects" of "4. Spectrophotometric method" in JIS Z 8722 (published Mar. 4, 1994, Japanese Standards Association) "Methods of color measurement." Among conditions a to d specified in the section 4.3, an optimum condition may be selected according to the shape of a surface to be measured. For example, when the polished surface of a ceramic ball, which will be described below, is to be measured, condition d (A specimen shall be illuminated with a bundle of rays whose beam axis angle forms an angle not exceeding 10° referring to the normal line to the specimen surface, and the light reflected in all directions shall be collected and received. The bundle of illuminating rays shall not include a ray deviating by 5° or more from its center line.) is preferred. As a simplified method, lightness and chroma may be determined by visual comparison with standard color chips prepared in accordance with JIS Z 8721 (1993).

Typically, ceramic balls formed of the sintered silicon nitride member of the present invention are applied to bearing balls used, for example, in machine tools and hard disk drives of computers, as well as to bearing balls used in high-temperature, corrosive environments, such as bearing balls of driving units of semiconductor equipment. This is because the ceramic balls have good corrosion resistance at high temperature. The inventive sintered silicon nitride member is also applicable to mechanical sliding components other than bearings, such as tappets used in automobiles. However, application of the present invention is not limited thereto. When the inventive sintered silicon nitride member is applied to bearing balls, the diameter thereof is about 1 mm to 30 mm. When the invented sintered silicon nitride member is applied to a sliding component, such as a bearing or a tappet, a portion of the sliding component including a sliding surface is formed of the inventive sintered silicon nitride member, and, in many cases, the sliding surface is polished to a mirror finish. By imparting a lightness or chroma falling within the previously mentioned range to a surface polished to a mirror finish, a previously mentioned defect or foreign matter appearing on the polished surface can be reliably identified. The surface polished to a mirror finish means herein a polished surface having an arithmetical mean roughness Ra of not greater than 0.10 μm. The arithmetical mean roughness Ra as used herein is obtained according to JIS B 0601 (published Feb. 8, 1994, Japanese Standards Association). In measuring surface roughness, a cutoff value and an evaluation length of roughness curve are selected from among those recommended in JIS B 0601 (1994), according to the roughness level to be measured.

The sintered silicon nitride member of the present invention contains a predominant amount of silicon nitride and a balance of a sintering aid component. Such a sintering aid component may be at least one element selected from the group consisting of Mg and elements belonging to Groups 3A, 4A, 5A, 3B (e.g., Al), and 4B (e.g., Si) of the Periodic Table, and may be contained in an amount of 1% by weight to 10% by weight on the basis of oxide. These elements are present within a sintered body in the form of their respective oxides. When the content of the sintering aid component is less than 1% by weight, the sintered body becomes less dense. When the content of the sintering aid component is in excess of 10% by weight, a sintered body suffers lack of strength, toughness, or heat resistance, and a sintered body serving as a sliding component suffers an impairment in wear resistance. Preferably, the sintering aid component is contained in an amount of 2% by weight to 8% by weight.

Examples of a commonly used sintering aid component belonging to Group 3A include Sc, Y, La, Ce, Pr, Nd, Sm, Eu, Gd, Tb, Dy, Ho, Er, Tm, Yb, and Lu. The content of each of these elements R is expressed on the basis of $RO_2$ for Ce and on the basis of $R_3O_3$ for the remaining elements. Particularly, oxides of heavy-rare-earth elements Y, Tb, Dy, Ho, Er, Tm, and Yb are used favorably, since they have the effect of improving strength, toughness, and wear resistance of a sintered silicon nitride body.

The microstructure of the sintered silicon nitride member is such that crystal grains comprising a predominant amount of silicon nitride and forming a main phase are bonded by means of a glassy and/or crystalline binding phase. Preferably, the main phase comprises a predominant $Si_3N_4$ phase which, in turn, comprises not less than 70% by volume (preferably not less than 90% by volume) α phase. In this case, the $Si_3N_4$ phase may be such that a portion of Si or N may be substituted by Al or oxygen and may contain metallic atoms, such as Li, Ca, Mg, and Y to form a solid solution. Examples of substituted silicon nitride include sialons represented by the following formulae.

β-sialon: $Si_{6-z}Al_zO_zN_{8-z}$ (z=0 to 4.2)

α-sialon: $M_x(Si,Al)_{12}(O,N)_{16}$ (x=0 to 2)

M: Li, Mg, Ca, Y, R (R represents rare-earth elements excluding La and Ce)

The aforementioned sintering aid component mainly constitutes the binding phase, but a portion of the sintering aid component may be incorporated into the main phase. The binding phase may contain unavoidable impurities; for example, silicon oxide contained in a material silicon nitride powder, in addition to intentionally added components serving as sintering aids.

Next, a specific method will be described for adjusting the color of at least a surface-layer portion of the sintered silicon nitride member of the present invention so as to fall within the aforementioned range of lightness VS (and/or chroma CS), namely, a method for causing the surface-layer portion to contain a cation of a transition metal element in an amount of 0.1% by weight to 3% by weight. Cations of a transition metal element behave as a color center within many ceramic materials and thus serve as a coloring agent. When the content of cations of a transition metal element is less than 1% by weight, the coloring effect becomes insufficient. When the content of cations of a transition metal element is in excess of 3% by weight, the surface-layer portion is colored to an excessive degree. In either case, the lightness VS of the surface-layer portion falls outside the aforementioned range. Herein, the "surface-layer portion" ranges from the surface of the member to a depth of 500 μm (when a state after polishing to a mirror finish is in question, the surface-layer portion ranges from the polished surface to the same depth).

Cations of a transition metal element for use in the present invention are particularly preferably ions of at least one element selected from the group consisting of Ta, Co, Ti, and Fe. Cations of these elements contained in a silicon nitride body to be sintered tend to behave as components which impart to a sintered body a grayish color of low chroma, so that a pore, etc. or foreign matter appearing on the base material serving as background can be more readily identified. Preferably, at least one element selected from the group consisting of Ta, Co, Ti, and Fe is contained in a total amount of 0.1% by weight to 3% by weight on the basis of $Ta_2O_5$ for Ta, CoO for Co, $TiO_2$ for Ti, or $Fe_2O_3$ for Fe, whereby the aforementioned requirement for lightness VS can be met.

Cations of a transition metal element, such as Ta, Co, Ti, or Fe, serving as a coloring component, may be added in the form of, for example, oxides. When cations of a transition metal element are added in the form of oxides, to a sintered body, a large portion of cations are incorporated into the aforementioned binding phase in the form of oxides, potentially serving as a sintering aid component. However, when cations of a transition metal element are added in an excessive amount, lightness becomes too low, and an impairment in strength of the binding phase results, potentially causing poor toughness and wear resistance of a sintered body.

Cations of a transition metal element serving as a coloring component may be added in any form other than oxide; i.e., cations of a transition metal element may be present in any form other than oxide in a sintered silicon nitride body, so long as they can serve as a color center which develops coloring. For example, cations of a transition metal element may be added in the form of a nitride (for example, TiN). In the case of addition in the form of a nitride, cations of a transition metal element may be present in the form of a nitride in a sintered body or may be converted to an oxide as a result of influence of excess oxygen. In any case, herein, the content of cations of a transition metal element serving as a coloring component is expressed on the basis of an oxide, regardless of the form in which cations are added. Whether or not an element potentially serving as a coloring component, such as Ta, Co, Ti, or Fe, is present in the form of cations can be readily confirmed, for example, by X-ray photoelectron spectroscopy (XPS or ESCA). Specifically, when, in a photoelectronic spectrum obtained by XPS or ESCA, a bond energy peak of an element in question shows a chemical shift in a direction such that ionic valence becomes more positive, the element can be considered to be present in the form of cations.

According to another method for coloring a surface-layer portion of a sintered body, a carbon-thickened layer having a carbon concentration higher than that of an inner-layer portion of the sintered body is formed in the surface-layer portion. In this case, preferably, in order to attain the aforementioned range of lightness VS (3.0 to 9.0), only a trace amount of carbon is present in the carbon-thickened layer. When a large amount of carbon is present in the carbon-thickened layer, the sintered body is colored black, disabling detection of a defect in automatic appearance inspection.

Such a trace amount of carbon can be detected by Raman spectroscopy. In the present invention, in order to attain the aforementioned range of lightness VS, the presence of carbon at a predetermined level must be ensured by Raman spectroscopy. Specifically, in Raman spectroscopy of the surface of a member, a peak ratio represented by X2/X1 is preferably 0.001 to 0.5, where X1 is the intensity of a peak appearing at $206\pm10$ cm$^{-1}$ (a peak corresponding to β-silicon nitride; hereinafter called a β-silicon nitride related peak), and X2 is the intensity of a peak appearing at $1584\pm20$ cm$^{-1}$ (a peak corresponding to graphite; hereinafter called a graphite related peak). When this peak ratio is in excess of 0.2, a sintered body is colored black in its appearance, potentially causing difficulty in detecting foreign matter. When this peak ratio is less than 0.001, a sintered body is colored near white in its appearance, potentially causing difficulty in detecting a pore, etc.

In Raman spectroscopy, observation of simultaneous presence of a silicon nitride related peak and a graphite related peak at a peak ratio X2/X1 (intensity of graphite related peak/intensity of β-silicon nitride related peak) of about 0.5 means that only a trace amount of carbon is present. When a large amount of carbon is present, a sintered body is colored black, disabling detection of a defect in automatic appearance inspection. When the carbon content increases such that the peak ratio X2/X1 is in excess of 0.5, a sintered body is colored near black, causing difficulty in detecting foreign matter. When the peak ratio X2/X1 is less than 0.001, a sintered body is colored near white, causing difficulty in detecting a pore, groove, crack, etc. at the surface. Notably, the intensity of a peak is defined as the height of a peak above a background level. The peak ratio X2/X1 is preferably not greater than 0.2. A carbon component is present in the form of amorphous carbon or polycrystalline graphite. In the case of polycrystalline graphite, in Raman spectroscopy, three peaks appear; at $1350\pm20$ cm$^{-1}$, $1584\pm20$ cm$^{-1}$, and $2710\pm20$ cm$^{-1}$, respectively. In this case, the peak of highest intensity is employed as X2.

According to the present invention, in order to impart a lightness VS of 3.0 to 9.0 to the surface of a sintered body, cations of a transition metal element serving as a coloring component are contained in the sintered body, or a carbon-thickened layer is formed in a surface-layer portion of the sintered body. However, the present invention is not limited thereto. For example, the above range of lightness VS may be attained by adjusting the content of a sintering aid component or by adjusting the firing conditions.

BRIEF DESCRIPTION OF THE DRAWINGS

The file of this patent contains at least one drawing executed in color. Copies of this patent with color drawing (s) will be provided by the Patent and Trademark office upon request and payment of the necessary fee.

DESCRIPTION OF REFERENCE NUMERALS:

40: ball bearing
43: ceramic ball (sintered silicon nitride member)
50: tappet
53: ceramic plate (sintered silicon nitride member)

DETAILED DESCRIPTION OF THE PREFERRED EMBODIMENTS

Embodiments of the present invention, together with a method for manufacturing the same, will next be described. Preferably, a material powder of silicon nitride is such that the α phase makes up not less than 70% of the main phase thereof. To the material powder, at least one element selected from the group consisting of rare-earth elements and elements belonging to Groups 3A, 4A, 5A, 3B, and 4B is added in an amount of 1% by weight to 10% by weight, preferably 2% by weight to 8% by weight, on the basis of oxide, so as to serve as a sintering aid. These elements may be added in the form of not only an oxide but also a compound to be converted to oxide in the course of sintering, such as a carbonate or hydroxide. The thus-prepared material powder is compacted into a predetermined shape by die pressing. When Ta, Co, Ti, or Fe, or a combination thereof is added so as to serve as a coloring agent, they are added to the above-described material powder in a total amount of 0.1% by weight to 3% by weight on the basis of $Ta_2O_5$ for Ta, CoO for Co, $TiO_2$ for Ti, or $Fe_2O_3$ for Fe. These elements may be added in the form of not only an oxide, but also a compound which is converted to an oxide in the course of sintering, such as a carbonate (e.g., $CoCO_3$) or hydroxide. Also, they may be added in the form of nitride, such as TiN.

Figure 9A:
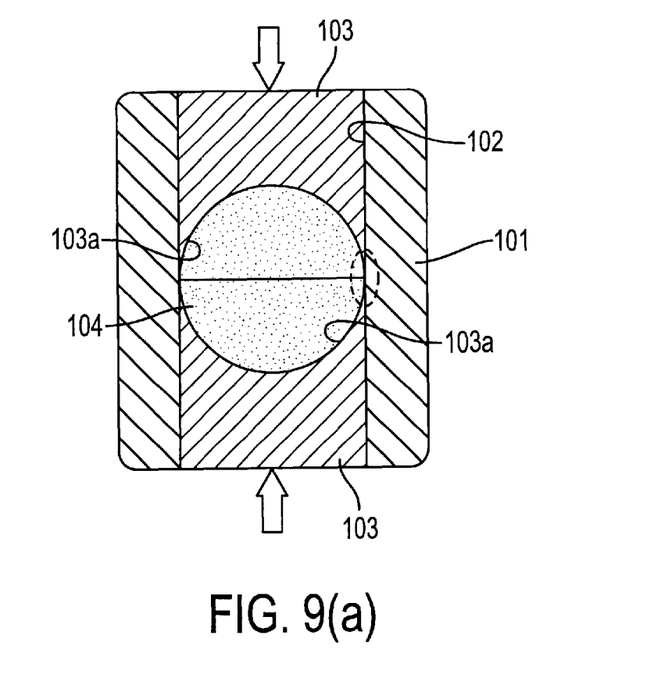
FIGS. 9(a)–(b) are views which illustrate methods for manufacturing spherical compacts by pressing.

For example, when a ceramic ball serving, for example, as a bearing ball is to be manufactured, a forming die 101 shown in FIG. 9(a) may be employed. Upper and lower press punches 103 are inserted into a die hole 102 formed in the forming die 101. A hemispheric cavity 103a is formed on the end face of each of the upper and lower press punches 103. Powder is compressed between the upper and lower press punches 103, thereby yielding a spherical ceramic compact 104.

Figure 9B:
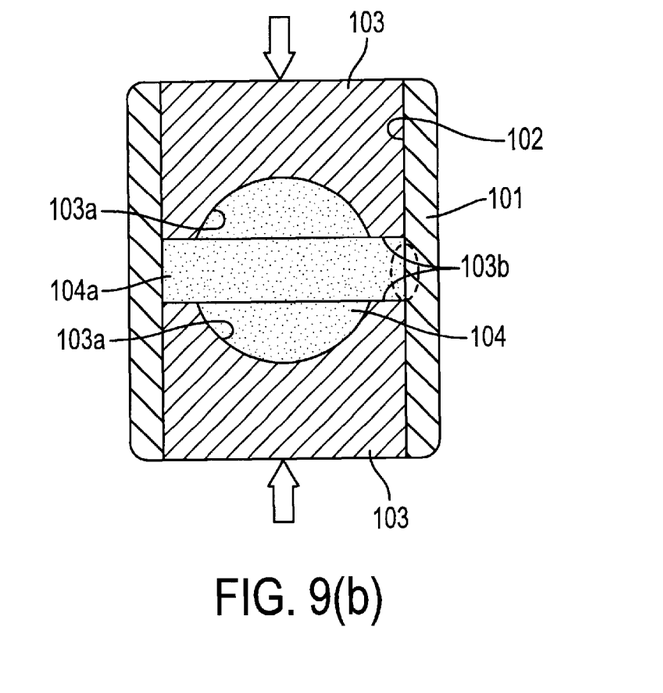

In some cases, the above-described die pressing may result in the following defect. Lack of pressing force applied by the press punches 103 arises at the circumferential edge portions of the hemispheric cavities 103a, causing nonuniform density in the ceramic compact 104. As a result, a defect, such as a crack or a chip, may arise on the ceramic compact 104, for example, at a position located in the vicinity of the joint between the cavities 103a. In order to avoid this problem, as shown in FIG. 9(b), a flat end face 103b is formed on each of the press punches 103 so as to increase the pressing force in a circumferential edge portion of each of the cavities 103a. This method involves forming a flange-like unnecessary portion 104, corresponding to the flat end faces 103b, on the compact 104. This unnecessary portion 104 must be removed by polishing before or after firing.

In manufacture of ceramic balls, in place of die pressing, cold isostatic pressing (CIP) may be employed.

The following methods other than forming by use of a die can also be employed. A material powder is dispersed in a thermoplastic binder to thereby form a slurry. This slurry is subjected to free fall from a nozzle. While assuming the form of a sphere by the action of surface tension, each droplet of the slurry is cooled and solidified in the air (as disclosed in, for example, Japanese Patent Application Laid-Open (kokai) No. 229137/1988). Alternatively, a material powder, a monomer (or prepolymer), and a dispersion solvent are mixed so as to obtain a slurry. This slurry is dispersed in the form of droplets in a liquid which does not admix with the slurry. In this dispersed state, the monomer or prepolymer is polymerized, thereby obtaining spherical bodies (as disclosed in, for example, Japanese Patent Application Laid-Open (kokai) No. 52712/1996).

Figure 1:
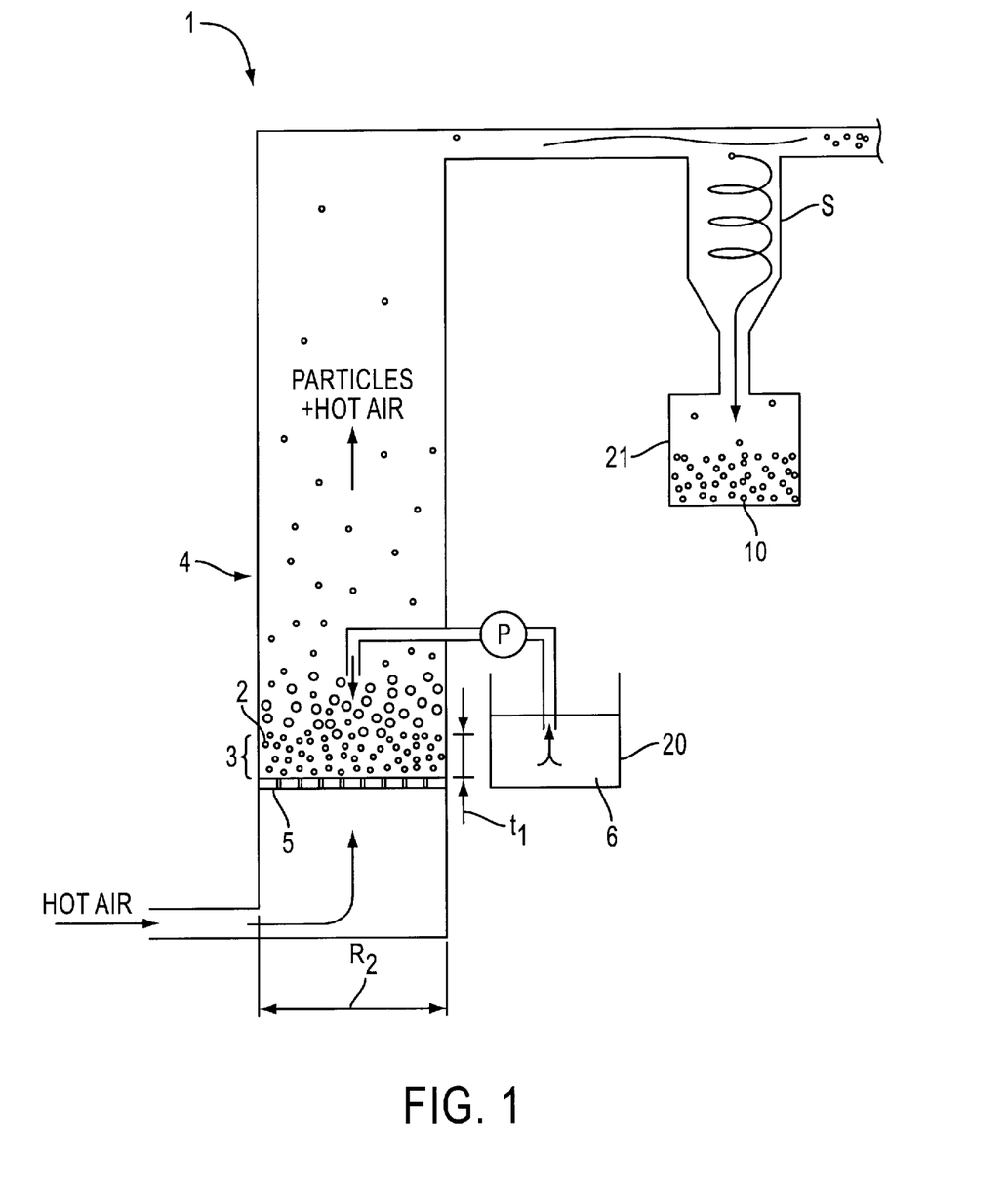
FIG. 1 is a vertical sectional view showing schematically an example of an apparatus for manufacturing a material powder.

A more preferred method for manufacturing ceramic balls will be described below. FIG. 1 shows an embodiment of an apparatus employed in a process for preparing a material powder. In the apparatus, a hot air passage 1 includes a vertically disposed hot air duct 4. The hot air duct 4 includes a drying-media holder 5, which is located at an intermediate position of the hot air duct 4 and which includes a gas pass body, such as a mesh or a plate having through-holes formed therein, adapted to permit passage of hot air and adapted not to permit passage of drying media 2. The drying media 2 is composed of ceramic balls, which are formed predominantly of alumina, zirconia, or a mixture thereof. The drying media 2 aggregate on the drying-media holder 5 to form an aggregation 3 of drying media.

Material is prepared in the form of a slurry which, in turn, is prepared in the following manner. An aqueous solvent is added to a mixture of silicon nitride powder and a sintering aid powder. The resultant mixture is wet-mixed (or wet-mixed and pulverized) using a ball mill or attriter, thereby yielding the slurry. Notably, the grain size of primary particles is adjusted such that the BET specific surface area of primary particles becomes 5 $m^2/g$ to 13 $m^2/g$.

Figure 2:
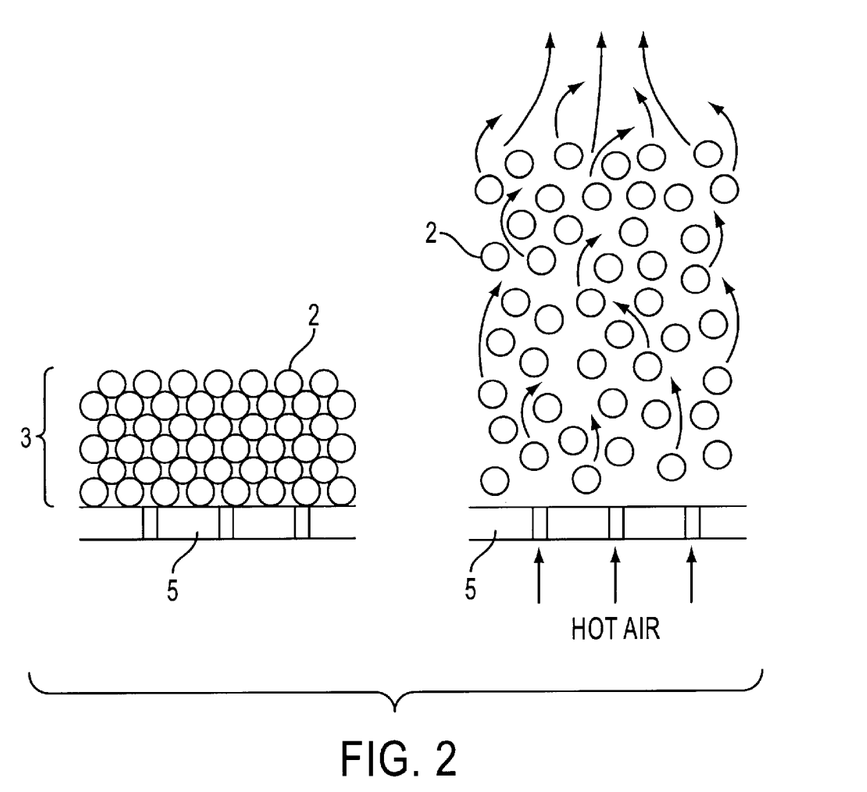
FIG. 2 shows views which illustrate the action of the apparatus of FIG. 1.
Figure 3:
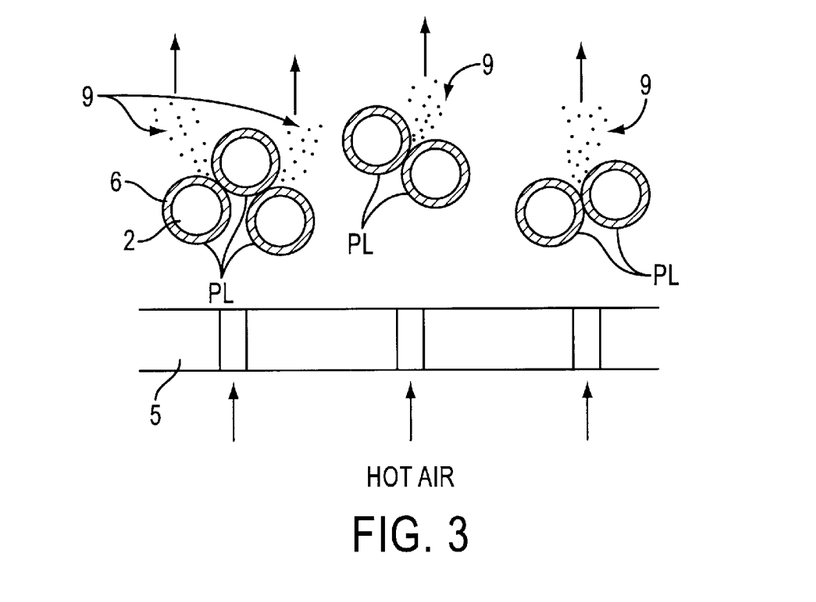
FIG. 3 is a view which illustrates actions subsequent to those of FIG. 2.

As shown in FIG. 2, hot air is forced to flow through the aggregation 3 of drying media from underneath the drying-media holder 5 and to flow upward through the hot air duct 4 while agitating the drying media 2. As shown in FIG. 1, a pump P pumps up a slurry 6 from a slurry tank 20. The slurry 6 is fed to the aggregation 3 of drying media from above and through gravity feed. As shown in FIG. 3, the slurry 6 adheres to the surfaces of the drying media 2 while being dried by hot air, thereby forming a powder aggregate layer PL on the surface of each drying medium 2.

The flow of hot air causes repeated agitation and fall of the drying media 2. Thus, the drying media 2 collide and rub against one another, whereby the powder aggregate layers PL are pulverized into material particles 9. Some of the material particles 9 assume the form of a solitary primary particle, but most of the material particles 9 assume the form of a secondary particle, which is the aggregation of primary particles. The material particles 9 having a grain size not greater than a certain value are conveyed downstream by hot air (FIG. 1). The material particles 9 having a grain size greater than a certain value are not blown by hot air, but again fall onto the aggregation 3 of drying media, thereby undergoing further pulverization effected by the drying media 2.

The material particles 9 conveyed downstream by hot air pass through a cyclone S and are then collected as material powder 10 in a collector 21. The collected material powder 10 is prepared so as to have an average grain size of 0.3 μm to 2 μm and a 90% grain size of 0.7 μm to 3.5 μm as measured using a laser diffraction granulometer, as well as a BET specific surface area of 5 $m^2/g$ to 13 $m^2/g$.

In FIG. 1, the diameter of the drying media 2 is determined as appropriate according to the cross-sectional area $R_2$ of the hot air duct 4. If the diameter of the drying media 2 is insufficient, a sufficiently large impact force will not be exerted on the powder aggregate layers PL formed on the drying media 2. As a result, the material powder 10 may fail to have a grain size falling within a predetermined range. If the diameter of the drying media 2 is excessively large, the flow of hot air will have difficulty in agitating the drying media 2, again causing poor impact force. As a result, the material powder 10 may fail to have a grain size falling within a predetermined range. Preferably, the drying media 2 has a substantially uniform diameter so as to leave an appropriate space thereamong, whereby the motion of the drying media 2 is accelerated by the flow of hot air.

A thickness t1 of the aggregation 3 of drying media 2 is determined such that the drying media 2 move appropriately according to the velocity of hot air. If the thickness t1 is excessively large, the drying media 2 will have difficulty in moving, causing poor impact force. As a result, the material powder 10 may fail to have a grain size falling within a predetermined range. If the thickness t1; i.e., the amount of the drying media 2, is excessively small, the drying media 2 will collide less frequently, resulting in impaired processing efficiency.

The temperature of hot air is determined such that the slurry 6 is dried sufficiently and the material powder 10 does not suffer any problem, such as thermal deterioration. For example, when a solvent used for preparation of the slurry 6 is composed predominantly of water, hot air having a temperature lower than 100° C. fails to sufficiently dry the fed slurry 6. The resultant material powder 10 has an excessively high water content and thus tends to agglomerate. As a result, the material powder 10 may fail to have a grain size falling within a predetermined range.

The velocity of hot air is determined so as not to cause the drying media 3 to fly into the collector 21. If the velocity is excessively low, the drying media 2 will have difficulty in moving, resulting in poor impact force. Therefore, the material powder 10 may fail to have a grain size falling within a predetermined range. If the velocity is excessively high, the drying media 2 will fly too high, causing reduced frequency of collision. Thus, processing efficiency will decrease.

Figure 4A:
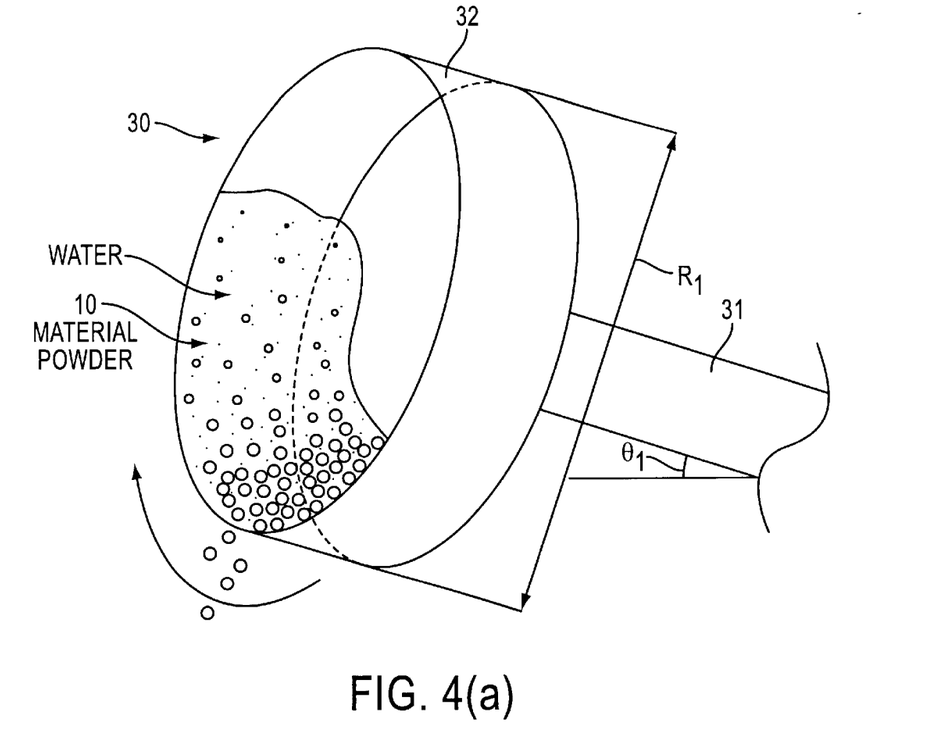
FIG. 4(a) is a perspective view of a rolling granulation apparatus.

The thus-obtained material powder 10 is formed into spherical bodies using a rolling granulation apparatus 30 shown in FIG. 4(a). The rolling granulation apparatus 30 may be a known apparatus. For example, the rolling granulation apparatus 30 includes a relatively flat, cylindrical granulation container 32 having a diameter $R_1$, which is open at a top end, and a rotating shaft 31, one end of which is connected substantially perpendicularly to a central portion of the bottom of the granulation container 32. The granulation container 32 is rotated by an unillustrated rotational drive unit by the rotating shaft 32. $\theta_1$ indicates a slanting angle of the rotating shaft 31 from the horizontal line.

Figure 4B:
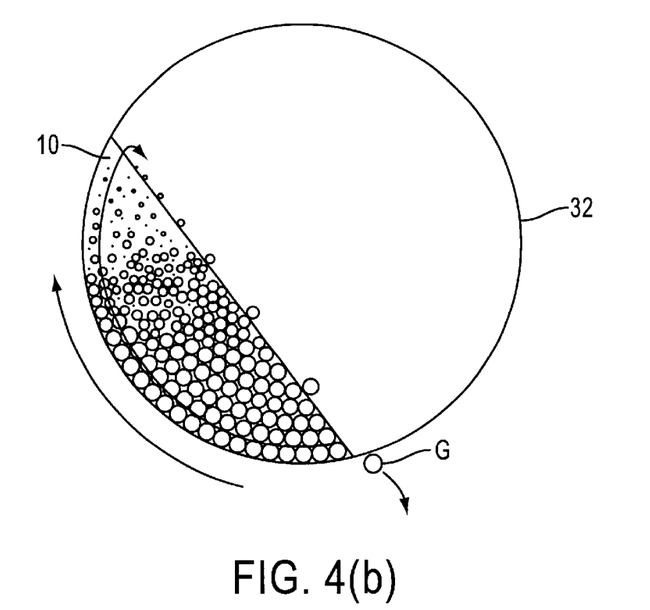
FIG. 4(b) is a view which illustrates the actions of the apparatus.

The material powder 10 and water are charged (for example, by spraying) into the granulation container 32 rotating at a constant peripheral speed. As shown in FIG. 4(b), the charged material powder P rolls down on an inclined powder layer formed within the granulation container 32 to thereby agglomerate into a spherical body G. Operating conditions of the rolling granulation apparatus 30 are adjusted such that the formed spherical body G has a diameter of not greater than 5 mm and a relative density of not less than 61%. Specifically, the rotational speed of the granulation container 32 is adjusted to 10 rpm to 200 rpm. Water feed rate is adjusted such that the final spherical body G has a water content of 10% by weight to 20% by weight. The thus-obtained spherical bodies G are fired according to a method which will be described below, thereby yielding sintered spherical silicon nitride bodies, each having a diameter of not greater than 4.5 mm.

Spherical bodies obtained by any of the above-described methods are subjected to two-stage firing; i.e., primary firing and secondary firing. Primary firing can be performed at a temperature not higher than 1900° C. in a nonoxidizing atmosphere containing nitrogen and having a pressure of 1 atm. to 10 atm. such that a sintered body obtained by primary firing has a relative density of not less than 78%, preferably not less than 90%. When a sintered body obtained through primary firing has a relative density of less than 78%, the sintered body which has undergone secondary firing tends to suffer a residual defect, such as a remaining pore, etc. Secondary firing can be performed at a temperature of 1600° C. to 1900° C. in nonoxidizing atmosphere containing nitrogen and having a pressure of 10 atm. to 1000 atm. When the pressure of secondary firing is lower than 10 atm., the decomposition of silicon nitride cannot be suppressed. Even when the pressure of secondary firing is increased in excess of 1000 atm., no advantage is gained with respect to effect, but rather disadvantage results with respect to cost. When the temperature of secondary firing is lower than 1600° C., a defect, such as a pore, cannot be eliminated with a resultant impairment in strength. When the temperature of secondary firing is higher than 1950° C., the strength of a sintered body is impaired due to growth of grains.

Figure 5A:
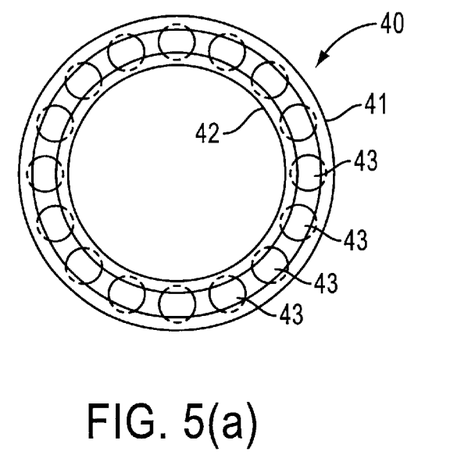
FIGS. 5(a) and 5(b) show schematic views of a ball bearing using ceramic balls of the present invention.
Figure 5B:
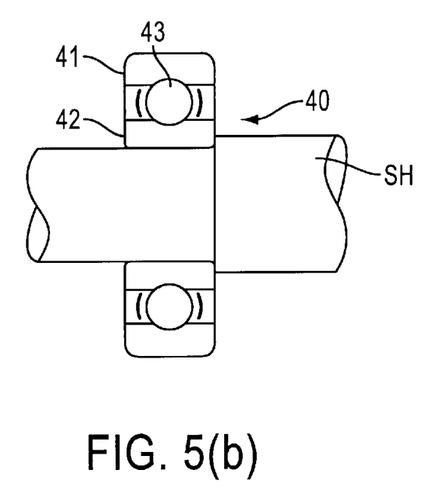
Figure 6:
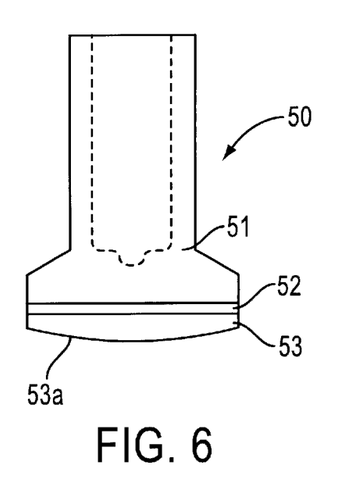
FIG. 6 is a front view showing an example of a tappet using a ceramic plate formed of a sintered silicon nitride body of the present invention.

The thus-obtained sintered bodies are subjected to precision polishing, yielding ceramic balls 43 shown in FIGS. 5(a) and 5(b). As shown in FIGS. 5(a) and 5(b), the ceramic balls 43 are disposed between an inner ring 42 and an outer ring 41, which are of metal or ceramic, thereby forming a ball bearing 40. A shaft SH is fixedly attached to the inner surface of the inner ring 42 of the ball bearing 40. The ceramic balls 43 are held in such a manner as to be rotatable or slidable with respect to the outer ring 41 or the inner ring 42. Application of the present invention is not limited to ball bearings. For example, the present invention may be applied to a ceramic tappet 50 shown in FIG. 6. In FIG. 6, a ceramic plate 53 formed of a sintered silicon nitride member of the present invention is bonded to an end face of a main body 51 of metal by means of a brazing material layer 52. One side of the ceramic plate 53 serves as a bond face, while the other side of the ceramic plate 53 serves as a sliding face 53a. The color tone of this sliding face 53a is adjusted such that the lightness VS assumes a value of 3.0 to 9.0.

In order to adjust the color tone of these sintered silicon nitride bodies (e.g., ceramic ball 43 and ceramic plate 53) such that the lightness VS assumes a value of 3.0 to 9.0, a main component ($Si_3N_4$ powder) of a sintered body, a sintering aid component ($Y_2O_2$, $Al_2O_3$, or Mgo powder), and a coloring component (powder of oxide or carbonate of Ta, Co, Ti, or Fe) are mixed in the following compositions, followed by firing.

(1) 93% by weight $Si_3N_4$-3% by weight $Y_2O_3$-3% by weight $Al_2O_3$-1% by weight $Ta_2O_5$ (2) 92% by weight $Si_3N_4$-3% by weight $Y_2O_3$-3% by weight $Al_2O_3$-2% by weight $Ta_2O_5$ (3) 93% by weight $Si_3N_4$-3% by weight $Y_2O_3$-3% by weight $Al_2O_3$-1% by weight $CoCO_3$ (4) 93.7% by weight $Si_3N_4$-3% by weight $Y_2O_3$-3% by weight $Al_2O_3$-0.3% weight $CoCO_3$ (5) 93% by weight $Si_3N_4$-3% by weight $Y_2O_3$-3% by weight $Al_2O_3$-1% by weight $TiO_2$ (6) 93% by weight $Si_3N_4$-3% by weight $Y_2O_3$-3% by weight $Al_2O_3$-1% by weight $Fe_2O_3$ (7) 93% by weight $Si_3N_4$-3% by weight $Y_2O_3$-3% by weight $Al_2O_3$-0.5% by weight $CoCO_3$-0.5% by weight $Fe_2O_3$ (8) 93% by weight $Si_3N_4$-3% by weight $Y_2O_3$-3% by weight $Al_2O_3$-0.5% by weight $TiO_2$-0.5% by weight $Fe_2O_3$ (9) 93% by weight $Si_3N_4$-3% by weight $Y_2O_3$-3% by weight $Al_{2O3}$-0.5% by weight $Ta_2O_5$-0.5% by weight $Fe_2O_3$ (10) 97% by weight $Si_3N_4$-1% by weight MgO-1% by weight $Al_2O_3$-0.5% by weight $TiO_2$-0.5% by weight $Fe_2O_3$ (11) 96.5% by weight $Si_3N_4$-2% by weight MgO-1% by weight $Al_2O_3$-0.5% by weight $TiO_2$ (12) 96.5% by weight $Si_3N_4$-2% by weight MgO-1% by weight $Al_2O_3$-0.5% by weight $Fe_2O_3$ Another method for forming a carbon-thickened layer in a surface-layer portion of a sintered body is carburizing heat treatment. Specifically, the surface of a sintered body is covered with a carbon-source substance. The thus-covered sintered body is heated so as to diffuse the carbon component into the surface of the sintered body. This carburizing heat treatment may be performed separately after completion of sintering. Alternatively, the following process may be employed. When sintering is performed in two stages, the surface of a sintered body is covered with a carbon-source substance after completion of primary sintering. Then, second firing which serves as a carburizing heat treatment is performed. The latter process is preferred, since uniform color tone can be obtained, and the lightness VS can be readily adjusted to the aforementioned range. This method for forming a carbon-thickened layer can be combined with the aforementioned method for adding a coloring agent.

Examples of a carbon-source substance include a simple carbon powder, such as graphite or amorphous carbon black, and a polymeric material powder containing a predominant amount of carbon. When carbon-source powder is used, the carbon-source powder is mixed with an organic solvent, singly or in combination with an aid powder, such as boron nitride (BN) powder, thereby obtaining a paste. Examples of the organic solvent include alcohols, ketones, or hydrocarbon halide. Particularly, a solvent of a low-molecular compound having 2 to 3 carbon atoms, such as ethyl alcohol, propyl alcohol, acetone, or trichloroethane may be used.

The thus-obtained paste is applied to the surface of a sintered body, followed by the above-described carburizing heat treatment. Carbon diffuses into the surface of the sintered body from the source powder of carbon contained in the paste, thereby forming a carbon-thickened layer. Instead of applying a paste to the surface of a sintered body as described above, a source powder of carbon may be directly deposited on the surface of a primary-fired body, for example, by electrostatic powder deposition. The form of a carbon-source substance is not limited to powder. For example, a primary-fired body may be covered with a carbon-source fiber, such as carbon fiber.

The color tone (i.e., carbon content) and thickness of the above-described carbon-thickened layer depend on the amount of a source of carbon covering the surface of a sintered body, the temperature, time, and pressure of carburizing heat treatment, and the density of a sintered body subjected to carburizing heat treatment. In any case, what is important is that treatment conditions must be selected such that the carbon content of the carbon-thickened layer becomes very low; specifically, such that in a Raman scattering spectrum profile obtained by Raman spectroscopy of the surface of the carbon-thickened layer, a peak ratio represented by X2/X1 is 0.001 to 0.5, where X1 is the intensity of a peak appearing at $206\pm10$ cm$^{-1}$ (a β-silicon nitride related peak), and X2 is the intensity of a peak appearing at $1584\pm20$ cm$^{-1}$ (a graphite related peak). Finally, the lightness VS of the surface of the carbon-thickened layer assumes a value ranging from 3.0 to 9.0.

For example, in the case where the surface of a primary-fired body is covered with a carbon-source substance, and then secondary firing which also serves as carburizing heat treatment is performed, it is preferable that the density of the primary-fired body be suppressed to less than 97%. Otherwise, the amount of carbon contained in a surface-layer portion of a sintered body which has undergone secondary firing may increase; as a result, the lightness VS may fail to increase beyond 3.0. Preferably, the amount of application of a source powder of carbon is 50 g to 800 g as reduced to carbon per square meter of surface of the primary-fired body. When the amount of application of a source powder of carbon is less than 50 g/m$^2$ on the carbon weight basis, nonuniform color tone arises on the surface of a sintered body, causing difficulty in identifying a defect and exhibiting tendency toward an increase in the size and number of pores in the sintered body. When the amount of application of a source powder of carbon is 800 g/m or more, the amount of carbon in the carbon-thickened layer becomes too large, potentially failing to attain a lightness VS of not less than 3.0. By satisfying these requirements and execution of secondary firing under the aforementioned conditions, a carbon-thickened layer having a predetermined lightness can be formed on the surface of a sintered body which has undergone secondary firing.

In the manufacture of bearing balls, in order to improve sphericity of sintered balls, the surface of each sintered ball is polished to a mirror finish. This polishing can be performed in either one of the following two manners: a portion of the carbon-thickened layer remains; and the carbon-thickened layer is removed such that the surface of an underlying layer is exposed.

In the former polishing, the carbon-thickened layer plays a major role in adjustment of color tone of the surface of a member. Since the thickness of the carbon-thickened layer decreases as a result of polishing, the thickness of the carbon-thickened layer must be determined with a polishing allowance taken into consideration. However, formation of an excessively thick carbon-thickened layer involves a great increase in processing time of carburizing heat treatment. Therefore, the carbon-thickened layer preferably assumes a thickness of, for example, not greater than 1 mm. In determining the thickness of a carbon-thickened layer, the carbon-thickened layer can be identified by observing a change in lightness appearing on an enlarged section of a sintered body in the thickness direction of the sintered body. When the thickness of a carbon-thickened layer is to be determined rigorously, the boundary of the carbon-thickened layer is specified as being located at a depth where lightness is 60% lightness V0, where V0 is the lightness of an uppermost surface-layer portion of the sintered body.

In the latter polishing, the exposed surface of an underlying layer plays a role in adjustment of color tone of the surface of a member. In this case, the carbon-thickened layer plays the following role. Notably, the boundary between the carbon-thickened layer and an underlying layer is defined as described above. Carburization is performed such that the lightness of a carbon-thickened layer is further decreased. As a result, through progress of carburization from the carbon-thickened layer toward the underlying layer, the carburization density of the underlying layer can be homogenized. Through exposure of the surface of the underlying layer by means of polishing, the degree of nonuniformity of color tone is decreased, whereby a stable color tone can be obtained. In this case, preferably, in a profile of Raman scattering spectrum obtained by Raman spectroscopy of the polished surface, the aforementioned peak ratio represented by X2/X1 is 0.001 to 0.5 so as to impart a lightness VS of 3.0 to 9.0 to the polished surface.

Carbon contained in a carbon-thickened layer may contribute to improvement in wear resistance of a member by improving solid lubrication performance of the carbon-thickened layer, in addition to contribution to adjustment in lightness of the carbon-thickened layer. Carbon enhances this effect when it is present in the form of polycrystalline graphite. Whether or not carbon is present in the form of polycrystalline graphite can be confirmed by determining whether or not a peak as observed by Raman spectroscopy appears at the following three positions: $1350\pm20$ cm$^{-1}$, $1584\pm20$ cm$^{-1}$, and $2710\pm20$ cm$^{-1}$.

The above-described methods for adjusting the color tone of the surface of a sintered body; i.e., addition of a coloring agent and formation of a carbon-thickened layer effected by carburizing heat treatment, can be carried out singly or in combination with each other. For example, when a predetermined color tone can be imparted to the surface only by addition of a coloring agent, there is no need to form a carbon-thickened layer. On the other hand, when a predetermined color tone can be imparted to the surface only by forming a carbon-thickened layer, addition of a coloring agent can be eliminated. Even when a predetermined color tone can be imparted to the surface of a member by addition of a coloring agent, if nonuniform color tone tends to arise on the surface, formation of a carbon-thickened layer effected through carburizing heat treatment may be combined therewith in order to prevent such tendency. That is, formation of a carbon-thickened layer can be employed subordinately in order to eliminate nonuniform color tone.

In Raman spectroscopy of the surface of a sintered body, when a peak ratio X2/X1 of 0.001 to 0.5 is observed, this means that a portion including the surface; i.e., a surface-layer portion, contains carbon in an amount such that the peak ratio represented by X2/X1 assumes a value of 0.001 to 0.5. Thus, the carbon concentration of the interior of a sintered body is not particularly limited. Specifically, any of the following patterns is acceptable: the carbon concentration of the interior is lower than that of the surface-layer portion; the carbon concentration is substantially equal between the surface-layer portion and the interior; and the carbon concentration of the interior is higher than that of the surface-layer portion. For example, a conceivable measure for enhancing the hardness of a sintered body is to increase the average carbon concentration in the finally obtained ceramic. In this case, the interior of the ceramic assumes a dark color tone. However, by sintering in a slightly oxidizing atmosphere established, for example, by introducing a trace amount of oxygen, a surface-layer portion of a sintered body undergoes decarbonization and thus exhibits a carbon concentration lower than that of the interior of the sintered body. As a result, the lightness of the surface-layer portion is rendered higher than that of the interior to thereby be adjusted to a predetermined value.

EXAMPLES

In order to confirm the effects of the present invention, the following experiments were conducted. However, the present invention should not be construed as being limited thereto.

Experiment 1

Silicon nitride (Si3N4) powder (average grain size: 0.5 µm; purity of silicon nitride: 90% by weight) serving as a main component of a sintered body, yttria ($Y_2O_3$) powder (average grain size: 1.5 µm), alumina ($Al_2O_3$) powder (average grain size: 1 µm), and magnesia (MgO) powder (average grain size: 0.5 µm), serving as sintering aid components were prepared. Also prepared were oxide or carbonate, and nitride powders of Ta, Co, Ti, and Fe, serving as coloring components. Test sample mixtures were prepared so as to contain the sintering aid components in a total amount of 1% by weight to 10% by weight on the basis of oxide, the coloring components in a total amount of 0.1% by weight to 3% by weight on the basis of oxide, and a balance of the silicon nitride component. Table 1 shows the compositions of the test sample mixtures. Test sample mixtures Nos. 5 to 9 did not contain the coloring components.

TABLE 1

| Sample No. | Si$_3$N$_4$ powder (wt. %) | Y$_2$O$_3$ powder (wt. %) | Al$_2$O$_3$ powder (wt. %) | MgO powder (wt. %) | Coloring agent powders Type | Content (wt. %) |
|---|---|---|---|---|---|---|
| 1 | 84 | 3 | 3 | 0 | Ta$_2$O$_5$ | 10 |
| 2 | 89 | 3 | 3 | 0 | CoCO$_3$ | 5 |
| 3 | 92 | 3 | 3 | 0 | Ta$_2$O$_5$ | 2 |
| 4 | 92 | 3 | 3 | 0 | 1% Ta$_2$O$_5$ + 1% Fe$_2$O$_3$ | |
| 5 | 94 | 3 | 3 | 0 | — | — |
| 6 | 94 | 3 | 3 | 0 | — | — |
| 7 | 94 | 3 | 3 | 0 | — | — |
| 8 | 92 | 3 | 3 | 2 | — | — |
| 9 | 75 | 10 | 10 | 5 | — | — |
| 10 | 97 | 0 | 1 | 1 | 0.5% Fe$_2$O$_3$ + 0.5% TiO$_2$ | |
| 11 | 93.7 | 3 | 3 | 0 | CoCO$_3$ | 0.3 |
| 12 | 89 | 3 | 3 | 2 | TiN | 3 |

*: Sample Nos. 5 and 6 did not contain coloring agents, but were coated with carbon paste so as to be colored.

Each of these sample mixtures and water or an organic solvent were wet-mixed and pulverized by use of a ball mill for 30 hours. The thus-obtained material slurry was dried using the drying, adjusting apparatus of FIG. 1, to thereby obtain a basis material powder. The thus-obtained basis material powder and water were charged into the granulation container 32 of the rolling granulation apparatus 30 shown in FIG. 4(a), to thereby obtain spherical bodies G. The rotational speed of the granulation container 32 was varied within a range of 5 rpm to 30 rpm depending on the size of the spherical body G. The thus-obtained spherical bodies were primary-fired at a temperature of 1500° C. to 1700° C. in nitrogen gas atmosphere having a pressure of 1 atm. Then, while being contained in a carbon sheath, the primary-fired spherical bodies G were secondary-fired at a temperature of 1750° C. in a nitrogen gas atmosphere having a pressure of 75 atm, to thereby obtain sintered bodies. Notably, primary-fired spherical bodies of sample Nos. 5 and 6 were processed in the following manner. Carbon power (trade name: EG-120, product of Toyo Tanso Co., Ltd.; 700 g) and ethyl alcohol (900 ml) were mixed and kneaded, to thereby obtain a paste. Primary-fired spherical bodies of sample No. 5 were coated with this paste at 390 g/m², followed by secondary firing. Primary-fired spherical bodies of sample No. 6 were coated with this paste at 150 g/m², followed by secondary firing.

The surface of each of the thus-obtained sintered bodies was polished to a mirror finish. The thus-polished surface of each of the sintered bodies was visually compared with standard color chips prepared in accordance with JIS Z 8721 (1993) to thereby determine hue, lightness, and chroma. The polished surface of each of the sintered bodies was observed with a stereomicroscope and with a metallographic microscope, at 10 magnifications to 200 magnifications, so as to visually determine whether or not metallic foreign matter and a pore, etc. could be identified against a background of base material. The results are shown in Table 2.

TABLE 2

| Sample No. | Hue | Lightness VS | Chroma CS | Identifiability Metallic foreign matter | Pore, cut |
|---|---|---|---|---|---|
| 1* | Achromatic color | 2.0 | Achromatic color | No | Yes |
| 2* | ↑ | 2.9 | ↑ | No | Yes |
| 3 | ↑ | 4.0 | ↑ | Yes | Yes |
| 4 | ↑ | 5.0 | ↑ | Yes | Yes |
| 5 | ↑ | 6.0 | ↑ | Yes | Yes |
| 6 | ↑ | 7.0 | ↑ | Yes | Yes |
| 7 | ↑ | 8.0 | ↑ | Yes | Yes |
| 8 | ↑ | 8.5 | ↑ | Yes | Yes |
| 9* | ↑ | 9.1 | ↑ | Yes | No |
| 10 | Bluish purple 5PB | 4.0 | 1 | Yes | Yes |
| 11 | ↑ | 6.0 | 1 | Yes | Yes |
| 12 | Purple 5P | 6.0 | 1 | Yes | Yes |

Samples marked with * fall outside the scope of the invention.
"Achromatic color" means that chroma CS is less than 1.0.

Figure 7A:
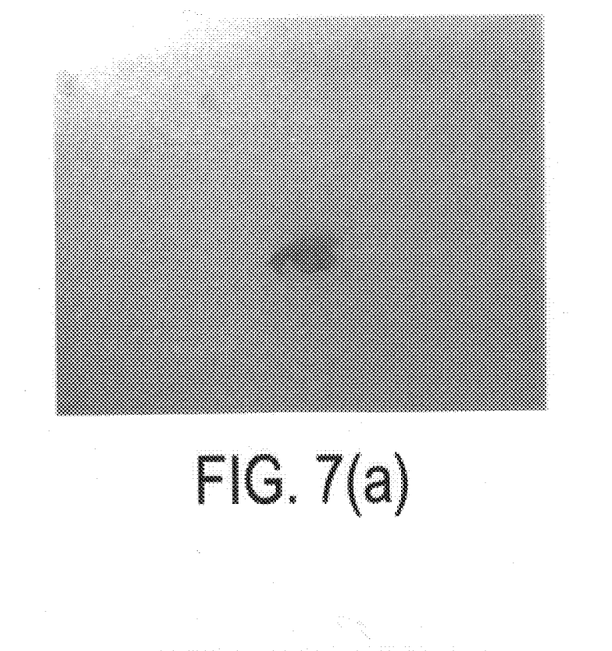
FIGS. 7(a)–(c) are enlarged pictures of metallic foreign matter (FIG. 7(a)) and an internal pore (FIG. 7(b)) as observed on the polished surface of sample No. 5 in Example 1, and an enlarged color picture (FIG. 7(c)) representing color tones of sintered bodies of sample Nos. 3, 5, 8, 10, and 12 in Example 1.
Figure 7B:
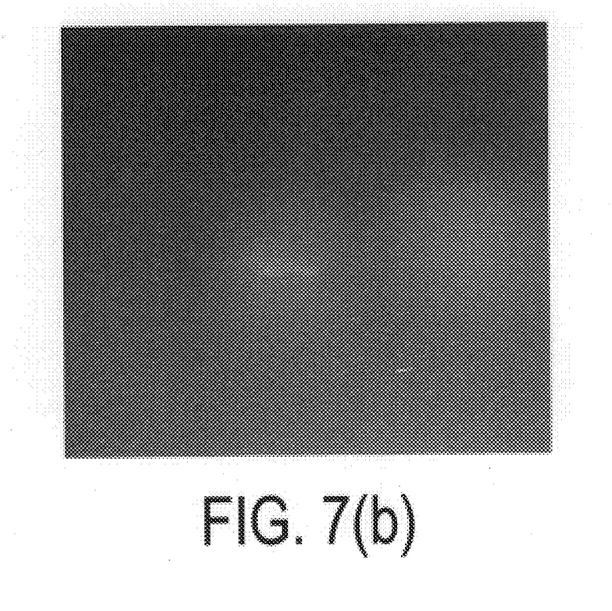
Figure 7C:
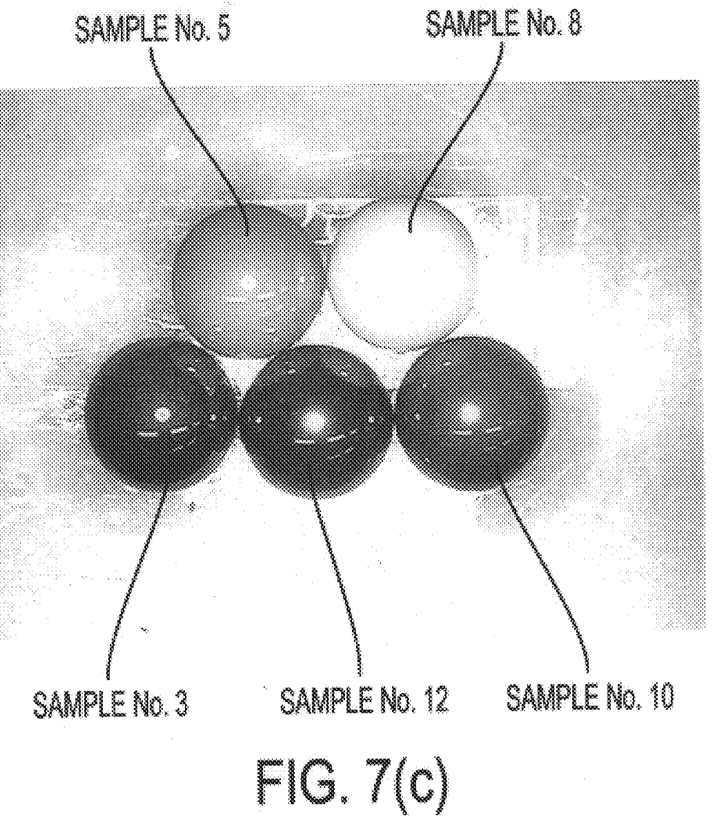

FIG. 7 shows enlarged pictures of metallic foreign matter and an internal pore which were observed on the polished surface of the sintered body of sample No. 5 in Table 2. The metallic foreign matter (FIG. 7(a)) is observed in a blackish tone, while the internal pore (FIG. 7(b)) is observed in a whitish tone. Since the lightness VS of a background portion of sample No. 5 was 6.0, the background color assumed a neutral tint between the metallic foreign matter and the internal pore, thereby producing a distinct contrast with both the metallic foreign matter and the internal pore, which assume different color tones. Accordingly, the metallic foreign matter and the internal pore can be easily identified by observing under a stereomicroscope or under a metallographic microscope using polarized light. FIG. 7(c) is an enlarged picture showing the color tones (hues) of the sintered bodies of sample Nos. 3, 5, 8, 10, and 12. Their color tones are listed below.

No. 3: lightness 4, achromatic color
No. 5: lightness 6, achromatic color
No. 8: lightness 8.5, achromatic color
No. 10: hue 5PB, lightness 4, chroma 1
No. 12: hue 5Y, lightness 6, chroma 3

As seen from Tables 1 and 2 and FIG. 7, when coloring components selected from among Ta, Co, Ti, and Fe are contained in a total amount of 0.1% by weight to 3% by weight on the basis of oxide, the polished surface of a sintered body assumes a lightness VS of 3.0 to 9.0, thereby enabling detection of metallic foreign matter and a pore, etc.

Experiment 2

94% By weight silicon nitride powder (average grain size: 0.7 μm; purity of silicon nitride: 99.1% by weight), 3% by weight $Y_2O_3$ powder (average grain size: 1.5 μm), and 3% by weight $Al_2O_3$ powder (average grain size: 1 μ) were mixed. The resultant mixture and water were mixed and pulverized using a ball mill for 30 hours. The thus-obtained material slurry was dried using the apparatus of FIG. 1, to thereby obtain a basis material powder. The thus-obtained basis material powder was formed into spherical bodies G using the rolling granulation process depicted in FIG. 4. The rotational speed of the granulation container 32 was varied within a range of 5 rpm to 30 rpm depending on the size of the spherical body G. 100 spherical bodies G were manufactured for each set of test conditions. A stainless steel piece having a size of about 200 μm and a resin bead having a size of about 500 μm were embedded in each of 10% of the 100 spherical bodies G; i.e., in each of 10 spherical bodies G, for intentional introduction of foreign matter.

The thus-obtained spherical bodies were primary-fired at a temperature of 1700° C. in a nitrogen gas atmosphere having a pressure of 1 atm. The density of the sintered bodies obtained by primary firing were measured by an Archimedean method. Carbon power (trade name: EG-120, product of Toyo Tanso Co., Ltd.; 700 g) and ethyl alcohol (900 ml) were mixed and kneaded, to thereby obtain a paste. This paste was applied in various amounts to the surfaces of the sintered bodies obtained by primary firing. Then, while being contained in carbon sheaths, the thus-coated sintered bodies were secondary-fired at a temperature of 1750° C. in a nitrogen gas atmosphere having a pressure of 75 atm. The resulting sintered bodies were all found to have a density of not less than 99% as measured by the Archimedean method.

The surface of each of the thus-obtained sintered bodies was polished to a mirror finish. The polished surface was observed for pores using a microscope and a scanning electron microscope (SEM). The diameter of a largest pore as observed in each of 10 spots each having an area of 1 mm² was measured. A largest pore having a diameter of not less than 3 μm was evaluated as not acceptable (x), while a largest pore having a diameter of not greater than 3 m was evaluated as acceptable (o). The polished surface of each of the sintered bodies was measured for the ratio of the intensity X2 of a peak appearing at 1584±20 cm⁻¹ (intensity of graphite related peak) to the intensity X1 of a peak appearing at 206±10 cm⁻¹ (intensity of β-silicon nitride related peak) (ratio X2/X1), using a Raman spectroscope (Labram, product of ISA Corp., France; Ar laser (wavelength: 514.5 nmp); spot diameter: 10 μm).

Figure 8A:
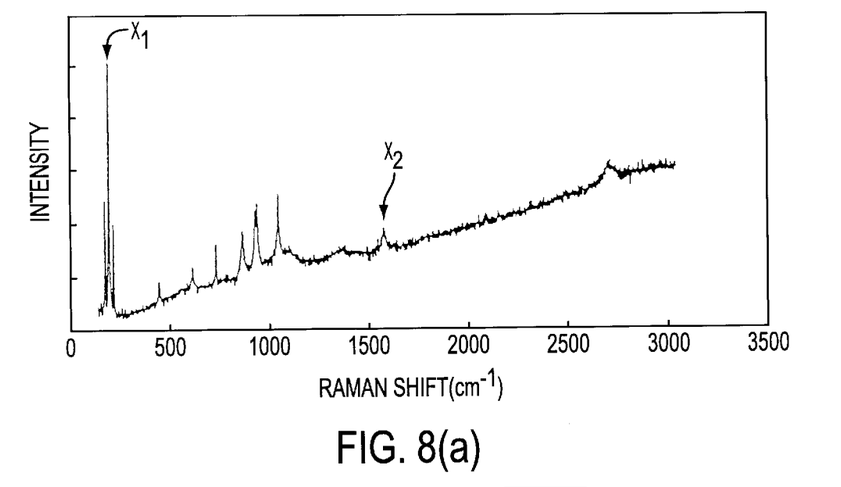
FIGS. 8(a)–(c) are Raman scattering spectrum profiles of sample No. 5 in Example 2.
Figure 8B:
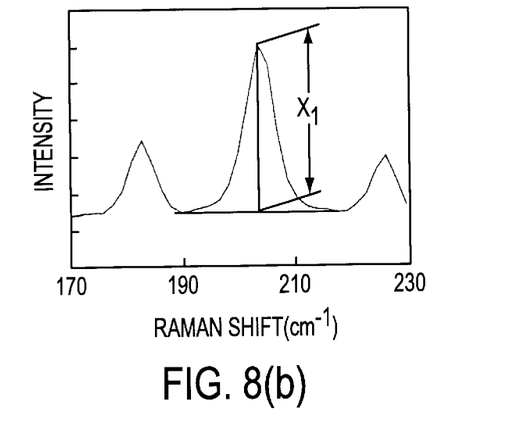
Figure 8C:
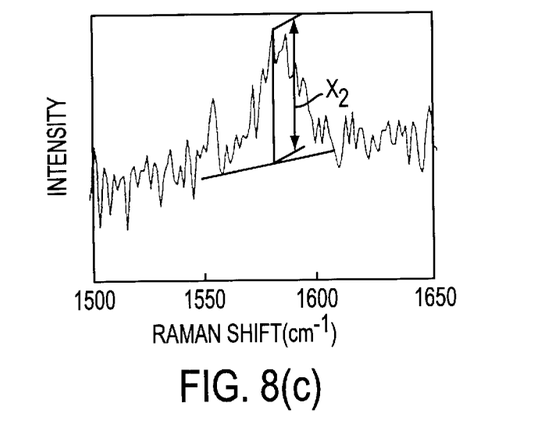

FIG. 8(a) shows a Raman scattering spectrum profile of sample No. 5. FIG. 8(b) is an enlarged view of a portion of the profile located in the vicinity of the peak appearing at 206±10 cm⁻¹ (β-silicon nitride related peak). FIG. 8(c) is an enlarged view of a portion of the profile located in the vicinity of the peak appearing at 1584±20 cm⁻¹ (graphite related peak). The height of a peak is obtained in the following manner. Components of not greater than 300 cm⁻¹ in wavelength are cut off from the profile of an obtained spectrum by means of a digital low-pass filter so as to generate a background curve. The height of projection above the background curve is taken as the height of a peak.

The polished surface of each of the sintered bodies was visually compared with standard color chips prepared in accordance with JIS Z 8721 (1993) to thereby determine hue, lightness, and chroma. The polished surface of each of the sintered bodies was observed with a stereomicroscope and a metallographic microscope, at 10 magnifications to 200 magnifications, so as to obtain the percentage of identification of the intentionally embedded foreign matter (100% when all of the 10 sintered bodies having foreign matter embedded intentionally are identified). As for pores, the percentage of sintered bodies having a pore to all sintered bodies was obtained. The results are shown in Table 3.

consisting of Ta, Co, Ti and Fe in a total amount of 0.1% by weight to 3% by weight on the basis of $Ta_2O_5$ for Ta, CoO for Co, $TiO_2$ for Ti, or $Fe_2O_3$ for Fe.

TABLE 3

| Examples | Average diameter of primary sintered body (μm) | Relative density of primary sintered body (%) | Amount of carbon per unit surface area of primary sintered body (g/m²) | Pore related evaluation | Graphite/$Si_3N_4$ Raman intensity ratio ($X_2/X_1$) | Hue | Lightness VS | Chroma CS | Percentage of identification of defect (%) Metallic foreign matter | Pore |
|---|---|---|---|---|---|---|---|---|---|---|
| 1* | 2.6 | 93.9 | 0 | X | 0 | AC | 9.5 | AC | 100 | 50 |
| 2* | 2.6 | 93.9 | 28 | X | 0 | AC | 7.5 | AC | 100 | 95 |
| 3 | 2.6 | 93.9 | 50 | ○ | 0.001 | AC | 7.5 | AC | 100 | 100 |
| 4 | 2.6 | 93.9 | 195 | ○ | 0.018 | AC | 6.5 | AC | 100 | 100 |
| 5 | 2.6 | 93.9 | 391 | ○ | 0.075 | AC | 6.0 | AC | 100 | 100 |
| 6 | 2.6 | 93.9 | 700 | ○ | 0.173 | AC | 4.5 | AC | 100 | 100 |
| 7* | 2.6 | 93.9 | 825 | ○ | 0.575 | AC | 2.5 | AC | 50 | 100 |
| 8 | 2.6 | 72.6 | 700 | X | 0.006 | AC | 7.0 | AC | 100 | 100 |
| 9 | 2.6 | 78.0 | 700 | ○ | 0.024 | AC | 7.0 | AC | 100 | 100 |
| 10 | 2.6 | 97.0 | 700 | ○ | 0.345 | AC | 4.0 | AC | 100 | 100 |
| 11* | 2.6 | 97.6 | 700 | ○ | 0.563 | AC | 2.5 | AC | 70 | 100 |
| 12 | 3.3 | 92.9 | 248 | ○ | 0.024 | AC | 6.5 | AC | 100 | 100 |
| 13* | 3.3 | 92.9 | 886 | ○ | 0.624 | AC | 2.5 | AC | 70 | 100 |
| 14 | 11.1 | 92.1 | 358 | ○ | 0.064 | AC | 6.0 | AC | 100 | 100 |
| 15* | 11.1 | 92.1 | 835 | ○ | 0.579 | AC | 2.5 | AC | 60 | 100 |

Samples marked with * fall outside the scope of the invention.
"AC (Achromatic color)" means that chroma CS is less than 1.0.

As seen from Table 3, at a Raman intensity ratio $X_2/X_1$ of 0.001 to 0.5, the lightness VS of the polished surface of each of the sintered bodies assumes a value of 3.0 to 9.0, and foreign matter or a pore can be detected accurately.

While the invention has been described in detail and with reference to specific embodiments thereof, it will be apparent to one skilled in the art that various changes and modifications can be made therein without departing from the spirit and scope thereof.

The application is based on Japanese Patent Application No. Hei. 11-254741 filed Sep. 8, 1999 which is incorporated herein by reference in its entirety.

What is claimed is:

1. A sintered silicon nitride member formed predominantly of silicon nitride, wherein at least a surface of the sintered member has a lightness VS of 3.0 to 9.0 and at least a surface-layer portion of the sintered member contains a cation of a transition metal element in an amount of 0.1% by weight to 3% by weight.

2. The sintered silicon nitride member as claimed in claim 1, wherein at least a surface of the sintered member has a lightness VS of 4.0 to 8.0.

3. The sintered silicon nitride member as claimed in claim 1, wherein the surface of said sintered member is polished to a mirror finish.

4. The sintered silicon nitride member as claimed in claim 2, wherein the surface of said sintered member is polished to mirror finish.

5. The sintered silicon nitride member as claimed in claim 1, wherein said cation comprises an ion of at least one element selected from the group consisting of Ta, Co, Ti and Fe.

6. The sintered silicon nitride member as claimed in claim 1, containing at least one element selected from the group consisting of Ta, Co, Ti and Fe in a total amount of 0.1% by weight to 3% by weight on the basis of $Ta_2O_5$ for Ta, CoO for Co, $TiO_2$ for Ti, or $Fe_2O_3$ for Fe.

7. The sintered silicon nitride member as claimed in claim 2, containing at least one element selected from the group consisting of Ta, Co, Ti and Fe in a total amount of 0.1% by weight to 3% by weight on the basis of $Ta_2O_5$ for Ta, CoO for Co, $TiO_2$ for Ti, or $Fe_2O_3$ for Fe.

8. The sintered silicon nitride member as claimed in claim 3, containing at least one element selected from the group consisting of Ta, Co, Ti and Fe in a total amount of 0.1% by weight to 3% by weight on the basis of $Ta_2O_5$ for Ta, CoO for Co, $TiO_2$ for Ti, or $Fe_2O_3$ for Fe.

9. The sintered silicon nitride member as claimed in claim 1, wherein a carbon-thickened layer having a carbon concentration higher than that of an inner-layer portion of the sintered member is formed in a surface-layer portion of the sintered member.

10. The sintered silicon nitride member as claimed in claim 2, wherein a carbon-thickened layer having a carbon concentration higher than that of an inner-layer portion of the sintered member is formed in a surface-layer portion of the sintered member.

11. The sintered silicon nitride member as claimed in claim 3, wherein a carbon-thickened layer having a carbon concentration higher than that of an inner-layer portion of the sintered member is formed in a surface-layer portion of the sintered member.

12. A ceramic ball formed of a sintered silicon nitride member as claimed in claim 1.

13. The sintered silicon nitride member as claimed in claim 1, wherein at least a surface of the sintered member has a chroma CS of not greater than 3.0.

14. The sintered silicon nitride member as claimed in claim 2, wherein at least a surface of the sintered member has a chroma CS of not greater than 3.0.

15. A sintered silicon nitride member formed predominantly of silicon nitride, wherein at least a surface of the sintered member has a lightness VS of 3.0 to 9.0, at least a surface-layer portion of the sintered member contains-a cation of a transition metal element in an amount of 0.1% by weight to 3% by weight, and a carbon-thickened layer having a carbon concentration higher than that of an inner-layer portion of the sintered member is formed in a surface-layer portion of the sintered member.

16. A sintered silicon nitride member formed predominantly of silicon nitride, wherein at least a surface of the sintered member has a lightness VS of 3.0 to 9.0, and said surface has a peak ratio of 0.05–0.5 represented by X2/X1, where X1 is an intensity of a peak appearing at $206\pm10$ cm$^{-1}$ and X2 is an intensity of a peak appearing at $1584\pm20$ cm$^{-1}$, respectively, obtained through Raman spectroscopy.

* * * * *